United States Patent
Suh et al.

(10) Patent No.: US 8,897,765 B2
(45) Date of Patent: Nov. 25, 2014

(54) METHOD AND APPRATUS FOR CONTROLLING SIGNAL TRANSMISSION

(75) Inventors: Jung Hoon Suh, Suwon-si (KR); Ki-Hong Park, Suwon-si (KR); Young-Chai Ko, Seoul (KR); Jin Hee Lee, Seoul (KR)

(73) Assignees: Samsung Electronics Co., Ltd., Suwon-si (KR); Korea University Industrial & Academic Collaboration Foundation, Seoul (KR)

( * ) Notice: Subject to any disclaimer, the term of this patent is extended or adjusted under 35 U.S.C. 154(b) by 1187 days.

(21) Appl. No.: 12/417,675

(22) Filed: Apr. 3, 2009

(65) Prior Publication Data

US 2010/0081424 A1 Apr. 1, 2010

(30) Foreign Application Priority Data

Sep. 26, 2008 (KR) .................. 10-2008-0094725

(51) Int. Cl.
*H04W 4/00* (2009.01)
*H04W 92/10* (2009.01)
*H04B 7/02* (2006.01)

(52) U.S. Cl.
CPC ............... *H04W 92/10* (2013.01); *H04B 7/022* (2013.01)
USPC ....... 455/422.1; 455/522; 455/63.1; 370/328; 370/348

(58) Field of Classification Search
CPC ....... H04W 88/02; H04W 4/02; H04W 88/06; H04W 64/00; H04W 92/10; H04B 7/022
USPC ......... 370/310, 328, 329, 330, 331, 332, 335, 370/342, 318, 441, 465, 252, 315, 268; 375/260, 133, 130, 141, 143; 455/403, 455/432.1, 434, 435.2, 436, 442, 443, 444, 455/448, 450, 451, 452.1, 452.2, 477, 455/562.1, 447, 422.1, 513, 509, 63.1, 522; 380/34; 700/239

See application file for complete search history.

(56) References Cited

U.S. PATENT DOCUMENTS 5,276,703 A * 1/1994 Budin et al. ................... 375/130
7,308,268 B2 * 12/2007 Barbosa da Torre et al. . 455/446

(Continued)

FOREIGN PATENT DOCUMENTS

KR 10-2004-0091671 10/2004
KR 10-2006-00135162 12/2006

OTHER PUBLICATIONS

Shin, Young-il et al., "Multi-antenna Subcarrier Allocation Using Zero-Forcing Beamfroming in MIMO-OFDM Systems," Oct. 2007, pp. 974-983, Journal of Korean Information and Communication Society. (T5: English Abstract Only).

(Continued)

*Primary Examiner* — Mahendra Patel
(74) *Attorney, Agent, or Firm* — NSIP Law (57) ABSTRACT

A method and apparatus for controlling signal transmission is provided. The method includes determining whether a signal to noise ratio (SNR) between a first base station and a signal receiving node is less than a threshold, and controlling the first base station and a second base station to cooperatively transmit a signal to the signal receiving node in response to the SNR being less than the threshold. Further, the second base station is located in an adjacent cell to a cell containing the first base station.

16 Claims, 5 Drawing Sheets

(56) References Cited

U.S. PATENT DOCUMENTS

| | | | |
|---|---|---|---|
| 2007/0041345 A1* | 2/2007 | Yarvis et al. | 370/331 |
| 2007/0147414 A1 | 6/2007 | Niu et al. | |
| 2008/0132262 A1* | 6/2008 | Jung et al. | 455/513 |
| 2008/0233968 A1 | 9/2008 | Hwang et al. | |
| 2008/0240018 A1* | 10/2008 | Xue et al. | 370/328 |
| 2010/0009710 A1* | 1/2010 | Zhang et al. | 455/522 |
| 2010/0098014 A1* | 4/2010 | Larsson | 370/329 |
| 2010/0157901 A1* | 6/2010 | Sanderovitz et al. | 370/328 |
| 2010/0303032 A1* | 12/2010 | Seo et al. | 370/329 |

OTHER PUBLICATIONS

Chae, Chan-Byoung et al., "Coordinated Beamforming with Limited Feedback in the MIMO Broadcast Channel," 11 pages, Oct. 2008, appears in Selected Areas in Communications, IEEE Journal on, vol. 26, Issue 8, as pp. 1505-1515.

Korean Office Action issued Jun. 26, 2014 in counterpart Korean Patent Application No. 10-2008-0094725 (7 pages, in Korean with English Translation).

* cited by examiner

METHOD AND APPRATUS FOR CONTROLLING SIGNAL TRANSMISSION

CROSS-REFERENCE TO RELATED APPLICATION

This application claims the benefit under 35 U.S.C. §119(a) of a Korean Patent Application No. 10-2008-0094725, filed Sep. 26, 2008, in the Korean Intellectual Property Office, the entire disclosure of which is incorporated herein by reference.

BACKGROUND

1. Field

The following description relates to a method and apparatus for controlling a signal transmission which controls whether to cooperatively transmit a signal using a data rate and a signal to noise ratio (SNR) between a base station and a signal receiving node.

2. Description of Related Art

In cellular communication environments, a user located in a cell edge experiences a case where a data rate is degraded due to co-channel interference (CCI) from adjacent base stations using identical frequency resources.

Accordingly, there has been research for network multiple-input multiple-output (MIMO) to enable multiple base stations to cooperatively transmit signals in order to remove CCI experienced by users and to improve a data rate.

In the case of a downlink for network MIMO, performance may vary depending on accuracy of feedback information since channel information between transmission/reception is required to be known to a base station.

Research for improving the performance of network MIMO is helpful for limited feedback environments in that it is difficult to perfectly feedback channel information to a base station in an actual communication system.

Factors such as inter-user interference (IUI) and CCI affect the performance of network MIMO in the limited feedback environment. In general, comparing the relative impact of the two factors on performance of a communication system, the IUI affects performance degradation of the communication system to a greater degree than the CCI in a cell edge, and the IUI causes performance degradation of the communication system in a center of a cell.

When multiple base stations transmit signals to users, the CCI may be removed, yet the IUI may be increased due to an error occurring between a quantized channel vector and an actual vector.

Therefore, a new technique capable of improving the performance of a communication system by cooperatively transmitting signals to users in consideration of impact of the CCI and the IUI is desired.

SUMMARY

In one general aspect, a method for controlling signal transmission includes determining whether a signal to noise ratio (SNR) between a first base station and a signal receiving node is less than a threshold, and controlling the first base station and a second base station to cooperatively transmit a signal to the signal receiving node in response to the SNR being less than the threshold, where the second base station is included in an adjacent cell to a cell including the first base station.

The method may further include controlling the first base station to transmit the signal to the signal receiving node in response to the SNR being not less than the threshold.

The controlling may include transmitting channel information about the signal receiving node to the second base station in response to the SNR being less than the threshold.

The SNR may be a long-term average SNR.

The method may further include the first base station and the second base station transmitting the signal to the signal receiving node according to Zero Forcing Beamforming (ZFBF).

In another general aspect, a method for controlling signal transmission includes calculating a first data rate with respect to a signal receiving node of a first base station and a second data rate according to cooperative transmission in response to the first base station and a second base station cooperatively transmitting a signal to the signal receiving node, where the second base station is included in an adjacent cell to a cell including the first base station, determining whether the second data rate exceeds the first data rate, and controlling the first base station and the second base station to cooperatively transmit the signal to the signal receiving node in response to the second data rate exceeding the first data rate.

The method may further include controlling the first base station to transmit the signal to the signal receiving node in response to the second data rate not exceeding the first data rate.

The controlling may include transmitting channel information about the signal receiving node to the second base station in response to the second data rate exceeding the first data rate.

The method may further include the first base station and the second base station transmitting the signal to the signal receiving node according to Zero Forcing Beamforming (ZFBF).

The calculating of the second data rate may include calculating a network channel matrix with respect to a network channel, formed in a network which includes the first base station and the second base station, using a long-term average SNR between the first base station and a plurality of signal receiving nodes, using a long-term average SNR between the second base station and the plurality of signal receiving nodes and using a channel matrix with respect to a channel formed between the first base station and the plurality of signal receiving nodes and the second base station and the plurality of signal receiving nodes, detecting a first received signal of the signal receiving node, where inter-user interference (IUI), co-channel interference (CCI) and a noise are utilized, via calculation based on a ZFBF matrix and the network channel matrix, the ZFBF matrix including a ZFBF matrix with respect to a signal receiving node of the first base station and a ZFBF matrix with respect to a signal receiving node of the second base station, calculating a first signal to interference plus noise ratio (SINR) of the signal receiving node based on the first received signal, and calculating the first data rate using the first SINR, detecting a second received signal of the signal receiving node where the IUI and the noise are utilized via the calculation based on the ZFBF with respect to the network channel matrix and calculation with respect to the network channel, and calculating a second SINR of the signal receiving node based on the second received signal, and calculating the second data rate using the second SINR.

In another general aspect, a computer-readable storage medium storing a program to control signal transmission, includes instructions to cause a computer to determine whether a signal to noise ratio (SNR) between a first base station and a signal receiving node is less than a threshold, and control the first base station and a second base station to cooperatively transmit a signal to the signal receiving node in response to the SNR being less than the threshold, where the second base station is included in an adjacent cell to a cell including the first base station.

In another general aspect, a computer-readable storage medium storing a program to control signal transmission, includes instructions to cause a computer to calculate a first data rate with respect to a signal receiving node of a first base station and a second data rate according to cooperative transmission in response to the first base station and a second base station cooperatively transmitting a signal to the signal receiving node, where the second base station is included in an adjacent cell to a cell including the first base station, determine whether the second data rate exceeds the first data rate, and control the first base station and the second base station to cooperatively transmit the signal to the signal receiving node in response to the second data rate exceeding the first data rate.

In another general aspect, an apparatus for controlling signal transmission includes a determination unit to determine whether an SNR between a first base station and a signal receiving node is less than a threshold, and a control unit to control the first base station and a second base station to cooperatively transmit a signal to the signal receiving node when the SNR is less than the threshold, where the second base station is included in an adjacent cell to a cell including the first base station.

The apparatus may further include controlling the first base station to transmit the signal to the signal receiving node in response to the SNR being not less then the threshold.

The control unit may include transmitting channel information about the signal receiving node to the second base station in response to the SNR being less than the threshold.

The SNR may be a long-term average SNR.

The apparatus may further include the first base station and the second base station transmitting the signal to the signal receiving node according to ZFBF.

The method and apparatus for controlling signal transmission controls whether to cooperatively transmit signals to a signal receiving node by considering inter-user interference (IUI) and co-channel interference (CCI) using a signal to noise ratio (SNR) between a base station and the signal receiving node or a data rate, thereby improving performance of a communication system.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the various apparatuses, methods, and/or systems described herein. Accordingly, various changes, modifications, and equivalents of the apparatuses, methods, and/or system described herein will be suggested to those of ordinary skill in the art. Also, descriptions of well-known functions and constructions may be omitted for increased clarity and conciseness.

Figure 1:
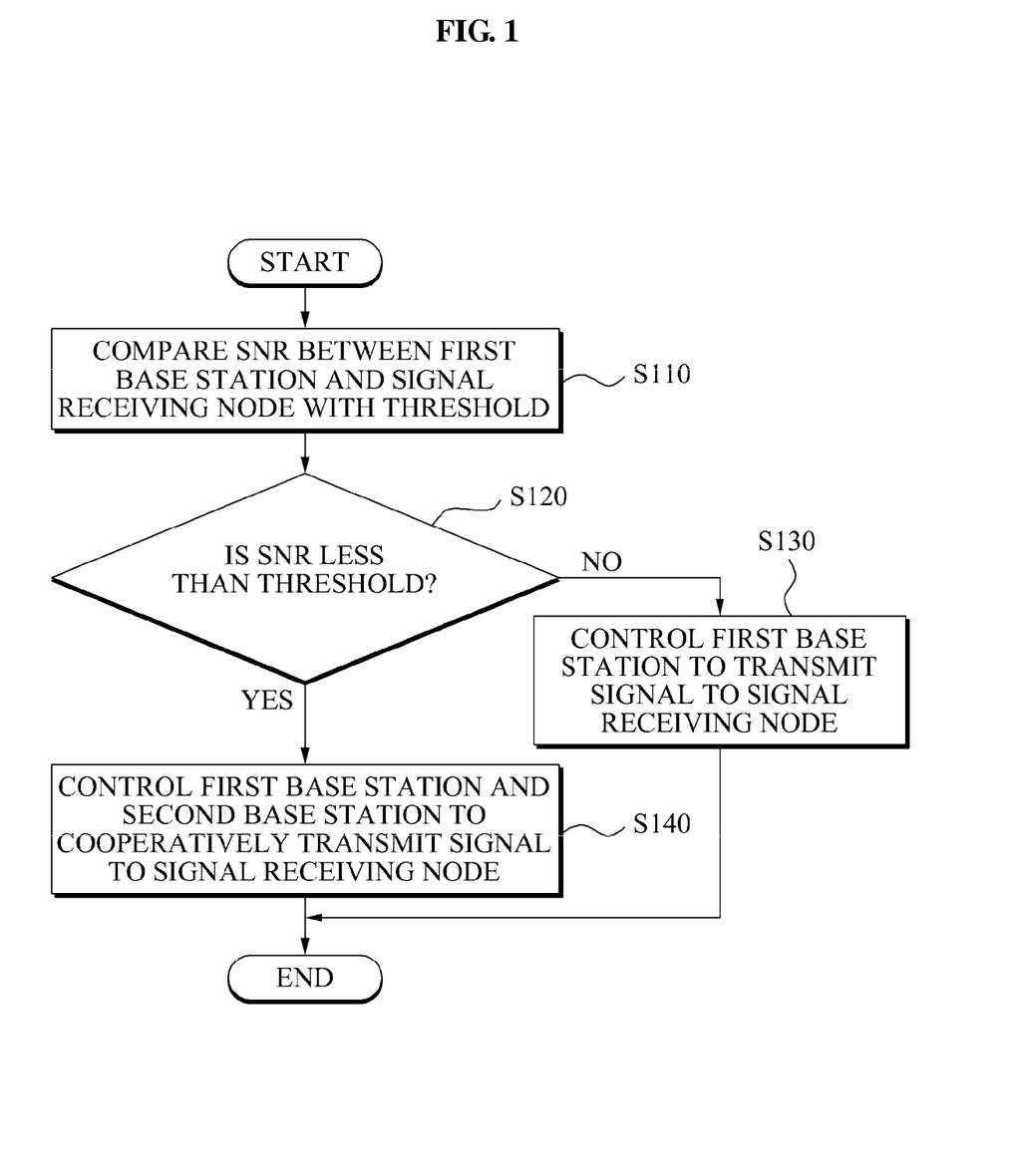
FIG. 1 is a flowchart illustrating an exemplary method for controlling signal transmission.

FIG. 1 illustrates an exemplary method for controlling signal transmission.

In operation S110, a signal to noise ratio (SNR) between a first base station and a signal receiving node is compared with a threshold. Here, the SNR may be a long-term average SNR.

In operation S120, it is determined whether the SNR is less than the threshold.

In response to the SNR not being less than the threshold, the first base station is controlled to transmit a signal to the signal receiving node in operation S130.

In response to the SNR being less than the threshold, the first base station and a second base station are controlled to cooperatively transmit a signal to the signal receiving node in operation S140.

In this instance, the second base station may be included in an adjacent cell to a cell including the first base station.

Operation S140 may further include transmitting of channel information about the signal receiving node to the second base station.

Also, the first base station and the second base station may transmit the signal to the signal receiving node according to Zero Forcing Beamforming (ZFBF).

Hereinafter, a method for controlling signal transmission is described further with reference to FIG. 2.

Figure 2:
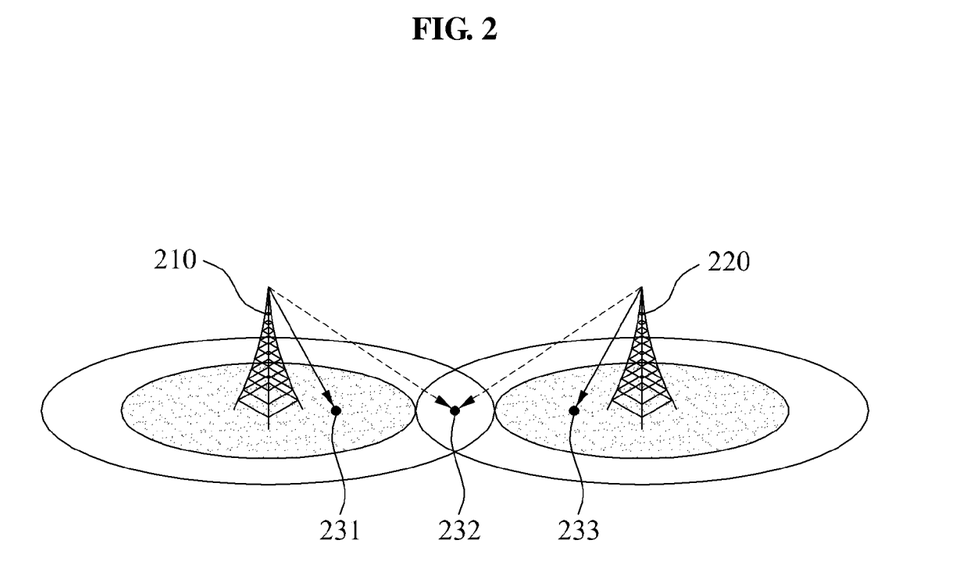
FIG. 2 is a diagram illustrating an exemplary communication system.

FIG. 2 illustrates an exemplary communication system.

Referring to FIG. 2, a base station (1) 210, a base station (2) 220, a signal receiving node (1) 231, a signal receiving node (2) 232, and a signal receiving node (3) 233 are illustrated.

For illustrative purposes, it is assumed that the signal receiving node (1) 231 is included in a coverage of the base station (1) 210 and a long-term average SNR exceeds a threshold. Also, it is assumed that the signal receiving node (2) 232 is included in a coverage of the base station (1) 210 and a coverage of the base station (2) 220, a service node corresponds to the base station (1) 210, and the long-term average SNR is less than the threshold. Further, it is assumed that the signal receiving node (3) 233 is included in the coverage of the base station (2) 220 and the long-term average SNR exceeds the threshold.

With respect to the controlling of signal transmission with respect to the signal receiving node (1) 231 of the base station (1) 210, the long-term average SNR between the base station (1) 210 and the signal receiving node (1) 231 is compared with the threshold in operation S110.

In operation S120, it is determined whether the long-term average SNR is less than the threshold.

In response to the long-term average SNR of the signal receiving node (1) 231 exceeding the threshold, the base station (1) 210 is controlled to transmit a signal to the signal receiving node (1) 231 in operation S130.

With respect to the controlling of signal transmission with respect to the signal receiving node (2) 232 of the base station (1) 210, it is determined whether a long-term average SNR between the base station (1) 210 and the signal receiving node (2) 232 is compared with the threshold in operation S110. In operation S120, it is determined whether the long-term average SNR is less than the threshold.

In response to the long-term average SNR of the signal receiving node (2) 232 being less than the threshold, the base station (1) 210 and the base station (2) 220 are controlled to cooperatively transmit a signal to the signal receiving node (2) 232 in operation S140.

Here, since a service node for the signal receiving node (2) 232 is the base station (1) 210, the base station (1) 210 may receive channel information from the signal receiving node (2) 232. However, operation S140 may include transmitting of channel information about the signal receiving node (2) 232 to the base station (2) 220 since the base station (2) 220 does not receive channel information from the signal receiving node (2) 232.

The controlling of signal transmission in the base station (1) 210 has been described hereto, and operations of controlling signal transmission in the base station (2) 220 are identical to those of the base station (1) 210.

For example, with respect to the controlling of signal transmission with respect to the signal receiving node (3) 233 of the base station (2) 220, the long-term average SNR between the base station (2) 220 and the signal receiving node (3) 233 is compared with the threshold in operation S110.

In operation S120, it is determined whether the long-term average SNR is less than the threshold.

In response to the long-term average SNR of the signal receiving node (3) 233 exceeding the threshold, the base station (2) 220 is controlled to transmit the signal to the signal receiving node (3) 233 in operation S130.

In one implementation, the communication system illustrated in FIG. 2 may be a communication system based on a multiple-input and multiple output (MIMO) scheme, and the base station (1) 210 and the base station (2) 220 may transmit a signal according to the ZFBF.

Accordingly, the method for controlling signal transmission according to an exemplary embodiment compares a long-term average SNR between a base station and a signal receiving node with a threshold, and enables both the base station and another base station located in an adjacent cell to cooperatively transmit a signal to the signal receiving node where the long-term average SNR is less than the threshold, and co-channel interference (CCI) of the signal receiving node located in a cell edge is removed. Accordingly, effective signal transmission may be realized. Where the long-term average SNR is not less than the threshold, only the base station is controlled to transmit the signal to the signal receiving node. Accordingly, inter-user interference (IUI) that occurs in the signal receiving node located around a center of a cell due to the cooperative signal transmission may be prevented.

Figure 3:
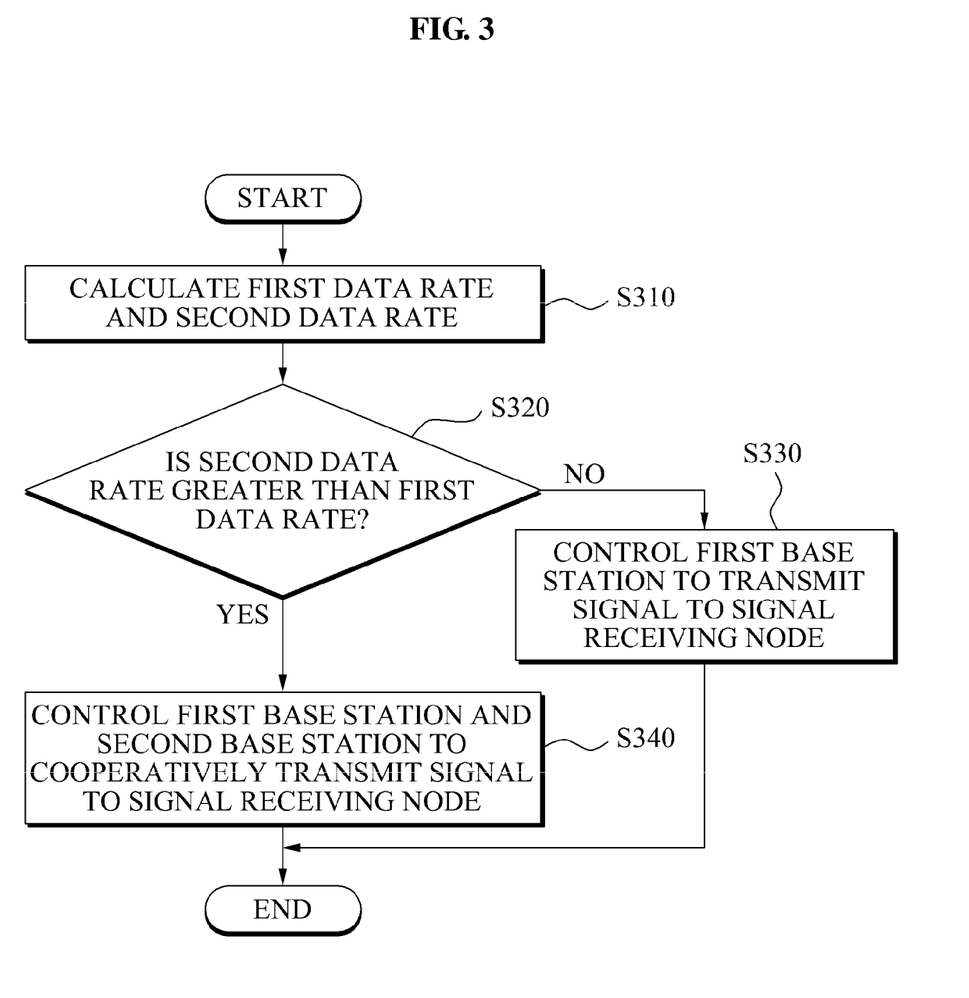
FIG. 3 is a diagram illustrating an exemplary method for controlling signal transmission.

FIG. 3 illustrates another exemplary method for controlling signal transmission.

In operation S310, a first data rate with respect to a signal receiving node of a first base station and a second data rate according to the cooperative signal transmission may be calculated, where the first base station and the second base station cooperatively transmit the signal to the signal receiving node.

In this instance, the second base station may be included in an adjacent cell to a cell including the first base station.

Also, the operation S310 may further include calculating of the first data rate and the second data rate.

With respect to the calculating of the first data rate, a network channel matrix is calculated with respect to a network channel, formed in a network which includes the first base station and the second base station, using a long-term average SNR between the first base station and a plurality of signal receiving nodes, a long-term average SNR between the second base station and the plurality of signal receiving nodes, and using a channel matrix with respect to a channel formed between the first base station and the plurality of signal receiving nodes and the second base station and the plurality of signal receiving nodes.

After the calculating of the network channel matrix, since the first base station and the second base station may transmit a signal to the plurality of receiving nodes according to ZFBF, the method for controlling signal transmission may further include an operation of detecting a first received signal of the signal receiving node, where IUI, CCI and a noise are utilized, via calculation based on the ZFBF matrix and the network channel matrix, the ZFBF matrix including a ZFBF matrix with respect to a signal receiving node of the first base station a ZFBF matrix with respect to a signal receiving node of the second base station.

After the detecting of the first received signal, the method for controlling signal transmission may include operations of calculating a first signal to interference plus noise ratio (SINR) of the signal receiving node based on the first received signal, and calculating the first data rate using the first SINR.

With respect to the calculating of the second data rate, the method for controlling signal transmission may include an operation of detecting a second received signal in the signal receiving node. The IUI and the noise are utilized via the calculation based on ZFBF with respect to the network channel matrix and via the calculation with respect to the network channel.

After detecting the second received signal, the method for controlling signal transmission may include operations of calculating a second SINR of the signal receiving node based on the second received signal, and calculating the second data rate using the second SINR.

Hereinafter, the calculating of the first data rate and the second data rate will be further described with reference to FIG. 4.

Figure 4:
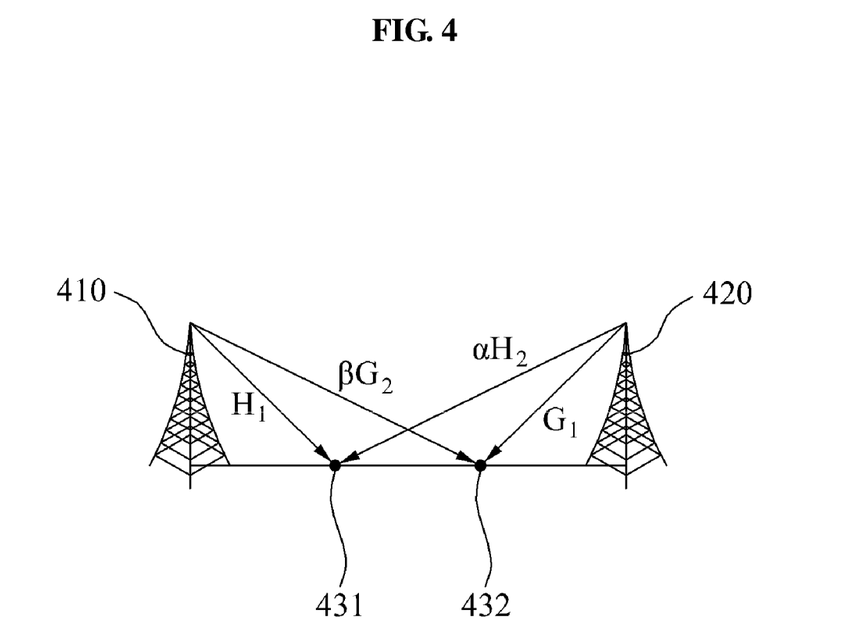
FIG. 4 is a diagram illustrating an exemplary communication system.

FIG. 4 illustrates another exemplary communication system.

Referring to FIG. 4, a base station (1) 410, a base station (2) 420, a signal receiving node (1) 431, and a signal receiving node (2) 432 are illustrated.

For illustrative purposes, it is assumed that a number of the base station (1) 410 and the base station (2) 420 are respectively two, a number of the signal receiving node (1) 431 and the signal receiving node (2) 432 are respectively one, and the communication system illustrated in FIG. 4 is a communication system based on a multi-user MIMO scheme. Also, it is assumed that $H_1$ is a channel matrix formed between the base station (1) 410 and the signal receiving node (1) 431, $H_2$ is a channel matrix formed between the base station (2) 420 and the signal receiving node (1) 431, $G_1$ is a channel matrix formed between the base station (2) 420 and the signal receiving node (2) 432, and $G_2$ is a channel matrix formed between the base station (1) 410 and the signal receiving node (2) 432. Further, it is assumed that a long-term average SNR between the base station (1) 410 and the signal receiving node (1) 431 and a long-term average SNR between the base station (2) 420 and the signal receiving node (2) 432 are $\Omega_1$, and a long-term average SNR between the base station (1) 410 and the signal receiving node (2) 432 and a long-term average SNR between the base station (2) 420 and the signal receiving node (1) 431 are $\Omega_2$.

Where locations of the signal receiving node (1) 431 with respect to the base station (1) 410 and the signal receiving node (2) 432 with respect to the base station (2) 420 are symmetrical, the network channel matrix H of a network including the base station (1) 410 and the base station (2) 420 may be represented by, $$H = \begin{bmatrix} \sqrt{\Omega_1} H_1 & \sqrt{\Omega_2} H_2 \\ \sqrt{\Omega_2} G_2 & \sqrt{\Omega_1} G_1 \end{bmatrix}.$$ [Equation 1]

In general, since the signal receiving node (1) 431 and the signal receiving node (2) 432 transmit channel information to the base station (1) 410 and to the base station (2) 420 in limited feedback environments, a quantized error occurs between channel information received in an actual channel and channel information received in the base station (1) 410 and the base station (2) 420. Therefore, the network channel matrix $\hat{H}$ where the quantized error is utilized may be represented by, $$\hat{H} = \begin{bmatrix} \sqrt{\Omega_1} \hat{H}_1 & \sqrt{\Omega_2} \hat{H}_2 \\ \sqrt{\Omega_2} \hat{G}_2 & \sqrt{\Omega_1} \hat{G}_1 \end{bmatrix}$$ [Equation 2]

The first data rate may be calculated using a ZFBF matrix with respect to the signal receiving node (1) 431 of the base station (1) 410 and a ZFBF matrix with respect to the signal receiving node (2) 432 of the base station (2) 420.

Since the ZFBF matrix does not require feedback regarding channel information between the base station (1) 410 and the base station (2) 420, the ZFBF matrix T using and $\hat{G}_1$ may be represented by, $$T = \begin{bmatrix} \hat{H}_1^H (\hat{H}_1 \hat{H}_1^H)^{-1} \Sigma_1 & 0 \\ 0 & \hat{G}_1^H (\hat{G}_1 \hat{G}_1^H)^{-1} \Lambda_1 \end{bmatrix} = \begin{bmatrix} V & 0 \\ 0 & W \end{bmatrix}.$$ [Equation 3]

Received signals y of the signal receiving node (1) 431 and the signal receiving node (2) 432 may be detected via calculation of Equation 4 based on the ZFBF matrix shown in Equation 3 and the network channel matrix shown in Equation 2.

$$y = \begin{bmatrix} y^{(1)} \\ y^{(2)} \end{bmatrix} = \begin{bmatrix} \sqrt{\Omega_1} H_1 & \sqrt{\Omega_2} H_2 \\ \sqrt{\Omega_2} G_2 & \sqrt{\Omega_1} G_1 \end{bmatrix} \begin{bmatrix} V & 0 \\ 0 & W \end{bmatrix} \begin{bmatrix} x^{(1)} \\ x^{(2)} \end{bmatrix} + \begin{bmatrix} n^{(1)} \\ n^{(2)} \end{bmatrix}$$ [Equation 4]

where $$\begin{bmatrix} x^{(1)} \\ x^{(2)} \end{bmatrix}$$

indicates a signal transmitted from each of the base station (1) 410 and the base station (2) 420, $$\begin{bmatrix} n^{(1)} \\ n^{(2)} \end{bmatrix},$$

indicates an additive White Gaussian Noise (AWGN).

Via the calculation of Equation 4, received signals $y_k$ received in each of the signal receiving node (1) 431 and the signal receiving node (2) 432 may be represented by, $$y_k^{(1)} =$$ [Equation 5]

$$\sqrt{\Omega_1} h_{1k} v_k x_k^{(1)} + \sqrt{\Omega_1} \sum_{j \neq k} h_{1k} v_j x_j^{(1)} + \sqrt{\Omega_2} h_{2k} W x^{(2)} + n_k^{(1)}$$

$$y_k^{(2)} = \sqrt{\Omega_1} g_{1k} w_k x_k^{(2)} + \sqrt{\Omega_1} \sum_{j \neq k} g_{1k} w_j x_k^{(2)} +$$

$$\sqrt{\Omega_2} g_{2k} V x^{(1)} + n_k^{(2)}.$$

Figure 5:
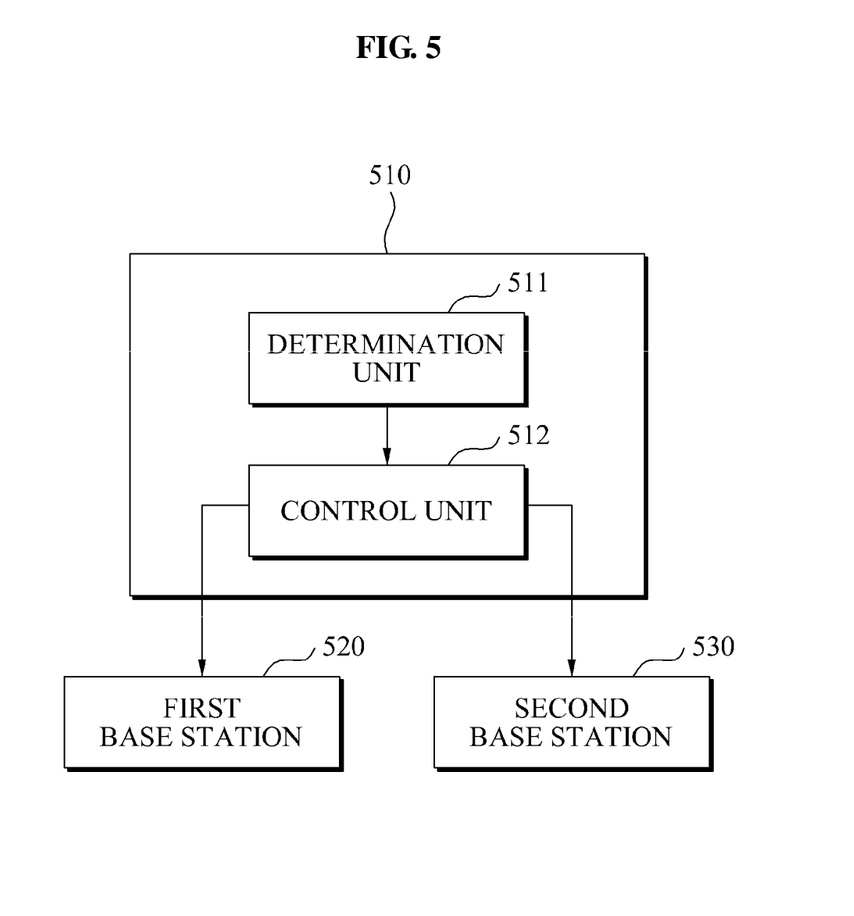
FIG. 5 is a diagram illustrating an exemplary apparatus for controlling signal transmission.

Referring to FIG. 5, it may be understood the received signals received in each of the signal receiving node (1) 431 and the signal receiving node (2) 432 include IUI, CCI and a noise.

Once the received signals of the signal receiving node (1) 431 and the signal receiving node (2) 432 are detected, an SINR of the signal receiving node (1) 431 and the signal receiving node (2) 432 may be calculated using the received signals.

In this instance, when it is assumed that transmission powers are identically allocated to the signal receiving node (1) 431 and to the signal receiving node (2) 432, the SINR may be represented by, $$SINR_k^{(1)} = \frac{E_x \Omega_1 |h_{1k} v_k|^2}{1 + E_x \Omega_1 \sum_{j \neq k} |h_{1k} v_j|^2 + E_x \Omega_2 \|h_{2k} W\|^2}$$ [Equation 6]

$$SINR_k^{(2)} = \frac{E_x \Omega_1 |g_{1k} w_k|^2}{1 + E_x \Omega_1 \sum_{j \neq k} |g_{1k} w_l|^2 + E_x \Omega_2 \|g_{2k} v\|^2}.$$

Once the SINR of the signal receiving node (1) 431 and the signal receiving node (2) 432 are calculated via Equation 6, first data rates with respect to the signal receiving node (1) 431 of the base station (1) 410 and first data rates with respect to the signal receiving node (2) 432 of the base station (2) 420 may be calculated based on the SINR.

When it is assumed that the first data rates of the base station (1) 410 and the base station (2) 420 are identical on average, Ergodic sum-rates $R_S$ with respect to the signal receiving node (1) 431 and the signal receiving node (2) 432 are calculated according to Equation 7, thereby calculating the first data rates.

$$R_S = \mathbb{E} \left[ \sum_k \log(1 + SINR_k^{(1)}) \right].$$ [Equation 7]

The calculating of the first data rate has been described above. Hereinafter, the calculating of a second data rate is further described.

The second data rate may be calculated using the network channel matrix shown in Equation 2 and the ZFBF matrix with respect to the network channel.

The ZFBF matrix T with respect to the network channel may be represented by, $$T = \hat{H}^H (\hat{H} \hat{H}^H)^{-1} \Sigma.$$ [Equation 8]

In this instance, received signals y of the signal receiving node (1) 431 and the signal receiving node (2) 432 may be detected using Equation 9.

$$y = \begin{bmatrix} \sqrt{\Omega_1}\, H_1 & \sqrt{\Omega_2}\, H_2 \\ \sqrt{\Omega_2}\, G_2 & \sqrt{\Omega_1}\, G_1 \end{bmatrix} Tx + n = h_k t_k x_k + \sum_{j \neq k} h_k t_j x_i + n_k. \quad \text{[Equation 9]}$$

When the second data rate is calculated, since the signal receiving node (1) 431 and the signal receiving node (2) 432 receive signals, cooperatively transmitted from the base station (1) 410 and the base station (2) 420, received signals of the signal receiving node (1) 431 and the signal receiving node (2) 432 are identical with each other as shown in Equation 9.

Referring to Equation 9, it may be understood that IUI and a noise are included in the received signals.

Once the received signals are detected, an SINR of the signal receiving node (1) 431 and the signal receiving node (2) 432 may be calculated using Equation 10.

$$SINR_k = \frac{E_x |h_k t_k|^2}{1 + E_x \sum_{j \neq k} |h_k t_j|^2}. \quad \text{[Equation 10]}$$

When it is assumed that data rates of the base station (1) 410 and the base station (2) 420 are identical on average, the second data rates may be calculated by calculating the Ergodic sum-rate $R_c$ with respect to the signal receiving node (1) 431 and the signal receiving node (2) 432 according to Equation 11.

$$R_c = \frac{1}{2} \mathbb{E}\left[ \sum_k \log(1 + SINR_k) \right]. \quad \text{[Equation 11]}$$

The calculating of the first data rate and the second data rate is described in detail hereto. Hereinafter, the method for controlling signal transmission according to an exemplary embodiment is further described with reference to FIG. 3.

In operation S320, it is determined whether the second data rate exceeds the first data rate.

In response to the second data rate not exceeding the first data rate, the first base station is controlled to transmit a signal to a signal receiving node in operation S330.

In response to the second data rate exceeding the first data rate, the first base station and the second base station are controlled to cooperatively transmit a signal to the signal receiving node in operation S340.

Here, in one implementation, operation S340 may include transmitting of channel information about the signal receiving node to the second base station.

Also, as another implementation, the first base station and the second base station may transmit the signal to the signal receiving node according to ZFBF.

Hereinafter, the method for controlling signal transmission described in FIG. 3 is further explained, taking examples with reference to FIG. 2.

For illustrative purposes, it is assumed that the signal receiving node (1) 231 is included in a coverage of the base station (1) 210, the first data rate exceeds the second data rate. Also, it is assumed that the signal receiving node (2) 232 may be included in a coverage of the base station (1) 210 and a coverage of the base station (2) 220, the base station (1) 210 corresponds to a service node, and the second data rate exceeds the first data rate. Further, it is assumed that the signal receiving node (3) 233 is included in a coverage of the base station (2) 220 and the first data rate exceeds the second data rate.

With respect to controlling the signal transmission of the signal receiving node (1) 231 of base station (1) 210, the first data rate when the base station (1) 210 transmits the signal to the signal receiving node (1) 231 and the second data rate when the base station (2) 220 and the base station a 210 cooperatively transmit the signal to the signal receiving node (1) 231 are calculated in operation S310.

In operation S320, it is determined whether the second data rate exceeds the first data rate.

In response to the first data rate exceeding the second data rate, the base station (1) 210 is controlled to transmit the signal to the signal receiving node (1) 231 in operation S330.

With respect to controlling signal transmission of the signal receiving node (2) 232 of the base station (1) 210, a first data rate when the base station (1) 210 transmits a signal to the signal receiving node (2) 232 and a second data rate when the base station (1) 210 and the base station (2) 220 cooperatively transmit a signal to the signal receiving node (2) 232 are calculated in operation S310.

In operation S320, it is determined whether the second data rate exceeds to the first data rate.

In response to the second data rate exceeding the first data rate, the base station (1) 210 and the base station (2) 220 are controlled to cooperatively transmit a signal to the signal receiving node (2) 232 in operation S340.

Here, since a service node for the signal receiving node (2) 232 is the base station (1) 210, the base station (1) 210 may receive channel information from the signal receiving node (2) 232. However, according to an example embodiment, operation S340 may include transmitting of the channel information about the signal receiving node (2) 232 to the base station (2) 220 since the base station (2) 220 does not receive channel information from the signal receiving node (2) 232.

The controlling of signal transmission in the base station (1) 210 has been described hereto, and the controlling of signal transmission in the base station (2) 220 is identical to the controlling of signal transmission in the base station (1) 210.

For example, with respect to controlling the signal transmission of the signal receiving node (3) 233 of the base station (2) 220, a first data rate when the base station (2) 220 transmits a signal to the signal receiving node (3) 233 and a second data rate when the base station (2) 220 and the base station (1) 210 cooperatively transmit a signal to the signal receiving node (3) 233 are calculated in operation S310.

In operation S320, it is determined whether the second data rate exceeds the first data rate.

In response to the first data rate exceeding the second data rate, the base station (2) 220 is controlled to transmit the signal to the signal receiving node (3) 233 in operation S330.

In one implementation, the communication system illustrated in FIG. 2 may be a communication system based on a multi-user MIMO scheme, and, the first base station (1) 210 and the second base station 220 may transmit the signal according to ZFBF.

Accordingly, the method for controlling signal transmission according to an exemplary embodiment calculates a first data rate and a second data rate with respect to a signal receiving node, and, where the second data rate exceeds the first data rate, a base station, and another base station located in an adjacent cell to the base station cooperatively transmit a signal to the signal receiving node. Accordingly, effective transmission may be realized by removing CCI in the signal receiving node located in a cell edge. Where the second data rate does not exceed the first data rate, only the base station transmits the signal to the signal receiving node. Accordingly, IUI may be prevented from getting larger due to cooperative signal transmission.

The methods for controlling signal transmission as described above may be recorded, stored, or fixed in one or more computer-readable media including program instructions to cause a processor to implement or carry out various operations embodied by a computer to form a specific machine or apparatus. A non-exhaustive list of examples of computer-readable media may include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. A non-exhaustive list of examples of program instructions may include both steps, procedures, instructions embodied in machine code, such as produced by a compiler, and files containing higher level code that may be executed by the computer using an interpreter or other programming. Such hardware devices may be configured to act as one or more software modules in order to perform the exemplary method described above, or vice-versa.

FIG. 5 illustrates an exemplary apparatus for controlling signal transmission.

Referring to FIG. 5, an apparatus 510 for controlling signal transmission, a first base station 520, and a second base station 530 are illustrated.

The apparatus 510 for controlling signal transmission may include a determination unit 511 and a control unit 512.

The determination unit 511 may determine whether an SNR between a first base station 520 and a signal receiving node (not shown) is less than a threshold.

In one implementation, the SNR may be a long-term average SNR.

The control unit 512 may control the first base station 520 and a second base station 530 to cooperatively transmit a signal to the signal receiving node when the SNR is less than the threshold.

In one implementation, the control unit 512 may transmit channel information about the signal receiving node to the second base station 530 when the SNR is less than the threshold.

As another implementation, the control unit 512 may control the first base station 520 to transmit the signal to the signal receiving node when the SNR is not less than the threshold.

As another implementation, the first base station 520 and the second base station 530 may transmit the signal to the signal receiving node according to ZFBF.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method, executed by a controller of a cooperative communication system, for controlling signal transmission of the cooperative communication system, the method comprising:
   determining whether a signal to noise ratio (SNR) between a first base station and a signal receiving node is less than a threshold;
   transmitting channel information about the signal receiving node to a second base station in response to the SNR being less than the threshold;
   controlling the first base station and the second base station to cooperatively transmit a signal to the signal receiving node in response to the SNR being less than the threshold, where the second base station is included in an adjacent cell to a cell including the first base station; and
   calculating a signal to interference plus noise ratio (SINR) of the signal receiving node, based on a reception signal received by the signal receiving node, and calculating a data rate using the SINR.

2. The method of claim 1, further comprising:
   controlling the first base station to transmit the signal to the signal receiving node in response to the SNR being not less than the threshold.

3. The method of claim 1, wherein the SNR is an average SNR taken over a predetermined period of time.

4. The method of claim 1, wherein the first base station and the second base station transmit the signal to the signal receiving node according to Zero Forcing Beamforming (ZFBF).

5. A method for controlling signal transmission, the method comprising:
   calculating a first data rate with respect to a signal receiving node of a first base station and a second data rate according to cooperative transmission in response to the first base station and a second base station cooperatively transmitting a signal to the signal receiving node, where the second base station is included in an adjacent cell to a cell including the first base station;
   determining whether the second data rate exceeds the first data rate; and
   controlling the first base station and the second base station to cooperatively transmit the signal to the signal receiving node in response to the second data rate exceeding the first data rate, wherein
   the calculating of the first data rate and the second data rate is based on a long-term average SNR between the first base station and a plurality of signal receiving nodes, and a long-term average SNR between the second base station and the plurality of signal receiving nodes.

6. The method of claim 5, further comprising:
   controlling the first base station to transmit the signal to the signal receiving node in response to the second data rate not exceeding the first data rate.

7. The method of claim 5, wherein the controlling of the first base station and the second base station comprises:
   transmitting channel information about the signal receiving node to the second base station in response to the second data rate exceeding the first data rate.

8. The method of claim 5, wherein the first base station and the second base station transmit the signal to a signal receiving node according to ZFBF.

9. The method of claim 8, wherein the calculating of the second data rate comprises:
   calculating a network channel matrix with respect to a network channel, formed in a network which includes the first base station and the second base station, using the long-term average SNR between the first base station and the plurality of signal receiving nodes, using the long-term average SNR between the second base station and the plurality of signal receiving nodes and using a channel matrix with respect to a channel formed between the first base station and the plurality of signal receiving nodes and the second base station and the plurality of signal receiving nodes;

detecting a first received signal of the signal receiving node, where inter-user interference (IUI), co-channel interference (CCI) and a noise are utilized, via calculation based on a ZFBF matrix and the network channel matrix, the ZFBF matrix including a ZFBF matrix with respect to a signal receiving node of the first base station and a ZFBF matrix with respect to a signal receiving node of the second base station, wherein the calculated SINR is a first SINR that is based on the first received signal and the calculated data rate is a first data rate calculated from the first SINR;

detecting a second received signal of the signal receiving node where the IUI and the noise are utilized via the calculation based on the ZFBF with respect to the network channel matrix and calculation with respect to the network channel; and calculating a second SINR of the signal receiving node based on the second received signal, and calculating the second data rate using the second SINR.

10. A non-transitory computer-readable storage medium storing a program to control signal transmission of a cooperative communication system, the program comprising instructions to cause a computer of a controller of the cooperative communication system to:

determine whether a signal to noise ratio (SNR) between a first base station and a signal receiving node is less than a threshold;

transmit channel information about the signal receiving node to a second base station in response to the SNR being less than the threshold;

control the first base station and the second base station to cooperatively transmit a signal to the signal receiving node in response to the SNR being less than the threshold, where the second base station is included in an adjacent cell to a cell including the first base station; and calculate a signal to interference plus noise ratio (SINR) of the signal receiving node, based on a reception signal received by the signal receiving node, and calculate a data rate using the SINR.

11. A non-transitory computer-readable storage medium storing a program to control signal transmission, comprising instructions to cause a computer to:

calculate a first data rate with respect to a signal receiving node of a first base station and a second data rate according to cooperative transmission in response to the first base station and a second base station cooperatively transmitting a signal to the signal receiving node, where the second base station is included in an adjacent cell to a cell including the first base station;

determine whether the second data rate exceeds the first data rate; and control the first base station and the second base station to cooperatively transmit the signal to the signal receiving node in response to the second data rate exceeding the first data rate, wherein the calculating of the first data rate and the second data rate is based on a long-term average SNR between the first base station and a plurality of signal receiving nodes, and a long-term average SNR between the second base station and the plurality of signal receiving nodes.

12. An apparatus for controlling signal transmission, the apparatus comprising:

a determination unit to determine whether an SNR between a first base station and a signal receiving node is less than a threshold; and a control unit to:

transmit channel information about the signal receiving node to a second base station in response to the SNR being less than the threshold, and control the first base station and the second base station to cooperatively transmit a signal to the signal receiving node in response to the SNR being less than the threshold, where the second base station is included in an adjacent cell to a cell including the first base station; and a calculator to calculate a signal to interference plus noise ratio (SINR) of the signal receiving node, based on a reception signal received by the signal receiving node, and calculate a data rate using the SINR.

13. The apparatus of claim 12, wherein the control unit controls the first base station to transmit the signal to the signal receiving node in response to the SNR being not less than the threshold.

14. The apparatus of claim 12, wherein the control unit transmits channel information about the signal receiving node to the second base station in response to the SNR being less than the threshold.

15. The apparatus of claim 12, wherein the SNR is an average SNR taken over a predetermined period of time.

16. The apparatus of claim 12, wherein the first base station and the second base station transmit the signal to the signal receiving node according to ZFBF.

* * * * *